(12) United States Patent
Wang et al.

(10) Patent No.: US 8,689,339 B2
(45) Date of Patent: Apr. 1, 2014

(54) METHOD, SYSTEM AND APPARATUS FOR GAME DATA TRANSMISSION

(75) Inventors: Haibing Wang, Shenzhen Guangdong (CN); Bijian Guo, Shenzhen Guangdong (CN); Xiaohu Yang, Shenzhen Guangdong (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 703 days.

(21) Appl. No.: 12/032,804

(22) Filed: Feb. 18, 2008

(65) Prior Publication Data

US 2008/0161114 A1    Jul. 3, 2008

Related U.S. Application Data

(63) Continuation of application No. PCT/CN2006/002329, filed on Sep. 8, 2006.

(30) Foreign Application Priority Data

Sep. 10, 2005   (CN) .......................... 2005 1 0037255

(51) Int. Cl.
*G06F 21/00*   (2013.01)
(52) U.S. Cl.
USPC ................ 726/26; 380/28; 713/170; 713/201
(58) Field of Classification Search
USPC ........................................................ 726/26
See application file for complete search history.

(56) References Cited

U.S. PATENT DOCUMENTS

| | | | | |
|---|---|---|---|---|
| 5,491,752 A * | 2/1996 | Kaufman et al. | | 380/30 |
| 6,148,404 A * | 11/2000 | Yatsukawa | | 726/2 |
| 6,381,696 B1 * | 4/2002 | Doyle | | 713/156 |
| 6,393,569 B1 * | 5/2002 | Orenshteyn | | 726/4 |
| 6,993,137 B2 * | 1/2006 | Fransdonk | | 380/279 |
| 7,213,149 B2 * | 5/2007 | Mache | | 713/170 |
| 7,360,096 B2 * | 4/2008 | Bracewell et al. | | 713/183 |
| 7,697,692 B2 * | 4/2010 | Takata et al. | | 380/277 |
| 2002/0069076 A1 * | 6/2002 | Faris et al. | | 705/1 |
| 2002/0099940 A1 * | 7/2002 | Wang | | 713/168 |

(Continued)

FOREIGN PATENT DOCUMENTS

| | | |
|---|---|---|
| CN | 1558593 | 12/2004 |
| CN | 1627682 A | 6/2005 |

OTHER PUBLICATIONS

International Search Report for International Application No. PCT/CN2006/002329, with English translation.

(Continued)

*Primary Examiner* — Andrew Goldberg

(57) ABSTRACT

The present invention provides a method for game data transmission, including: acquiring, by a client upon logging into a server, a session key assigned by the server; encrypting game data with the session key, and submitting the encrypted game data to the server; decrypting and verifying the received game data by the server, and saving the game data if the game data are proved to be valid. The present invention also provides a system, client apparatus, server and mobile terminal including the client apparatus to which the preceding method can apply. The method, system and apparatus of the present invention ensure that the client can transmit game data safely to the server and protect the game data from being tampered with or counterfeited.

9 Claims, 2 Drawing Sheets

(56) References Cited

U.S. PATENT DOCUMENTS

| | | |
|---|---|---|
| 2002/0104019 A1* | 8/2002 | Chatani et al. .............. 713/201 |
| 2002/0116615 A1* | 8/2002 | Nguyen et al. .............. 713/168 |
| 2002/0133707 A1* | 9/2002 | Newcombe ................ 713/183 |
| 2002/0176572 A1* | 11/2002 | Ananth ........................ 380/37 |
| 2002/0178366 A1* | 11/2002 | Ofir ............................ 713/182 |
| 2003/0163684 A1* | 8/2003 | Fransdonk .................. 713/153 |
| 2003/0182574 A1 | 9/2003 | Whitten et al. |
| 2003/0221112 A1* | 11/2003 | Ellis et al. .................. 713/189 |
| 2003/0229779 A1* | 12/2003 | Morais et al. .............. 713/153 |
| 2004/0185931 A1* | 9/2004 | Lowell et al. ................ 463/17 |
| 2005/0138362 A1* | 6/2005 | Kelly et al. ................ 713/156 |
| 2006/0211491 A1* | 9/2006 | Falvey et al. ................ 463/29 |
| 2006/0218397 A1* | 9/2006 | Brown et al. .............. 713/168 |

OTHER PUBLICATIONS

Chinese Office Action for Chinese Patent Application No. 200510037255.6, dated Jul. 17, 2009, and English translation thereof.

* cited by examiner

METHOD, SYSTEM AND APPARATUS FOR GAME DATA TRANSMISSION

CROSS-REFERENCE TO RELATED APPLICATIONS

This application is a continuation of International Application No. PCT/CN2006/002329, filed Sep. 8, 2006. This application claims the benefit of Chinese Patent Application No. 200510037255.6, filed Sep. 10, 2005. The disclosures of the above applications are incorporated herein by reference.

FIELD

The present invention relates to computer communication technology, and particularly to a method and system for game data transmission and corresponding client apparatus and server.

BACKGROUND

The statements in this section merely provide background information related to the present disclosure and may not constitute prior art.

Flash is an animation program language used on Internet. Flash adopts network streaming media technology and is thus out of the restraint of network bandwidth. Flash can provide animation on networks at faster rate, realize animated interaction, give play to creativity and imagination of individuals, and provide most beautiful web pages, vivid animated presentation and interacted games. Existing Flash game implements game logics on individual client terminals by using the Flash technology, and provides interface on a higher level for network communication to transmit the game result data unidirectionally to other computers, as shown in FIG. 1 in which the sender of the game result data is regarded as a client and the receiver as a server. Two ways are usually used for game data transmission at present. According to the first way, a standard web server and a web application shall be set up on the server side. The web application may use a dynamic webpage language such as Common Gateway Interface (CGI) language, or Active Server Pages (ASP) language, or Java Server Pages (JSP) language, or Hypertext Preprocessor (PHP) language. The Flash application on the client side invokes the web application by using a Uniform Resource Locator (URL), and the web application receives the data from the Flash application via the URL. The second way uses a socket network communication interface in the Flash engine, i.e., an eXtensible Markup Language (XML) socket. According to the second way, the sender encapsulates the data into XML messages before sending the data to the server side. The server side listens at a port agreed on in advance, receives the data sent from the client side at the port and parses the XML messages to retrieve the data.

It can be seen that the client terminals of existing Flash games sends the ultimate game data to servers and the servers unconditionally trust the data from client terminals. The client terminals have no reliable logics to ensure the validity and accuracy of the game data and thus have not means to protect the game result data from being counterfeited or tampered with.

SUMMARY

The present invention provides a method, system and apparatus for game data transmission, so as to solve the problem in the existing Flash game that a client terminal has neither reliable logics to ensure the validity and accuracy of game data, nor means to protect game data from being counterfeited or tampered with during the transmission of the game data to a server.

The method provided by the present invention for game data transmission includes:
acquiring by a client upon logging into a server a session key assigned by the server and launching a game program;
encrypting game data with the session key by the client when the game data is to be submitted, and submitting the game data to the server.

The method further includes decrypting and verifying the received game data by the server, and saving the game data if the game data are proved to be valid.

The present invention provides a system, as well as the method, for game data transmission, including:
a server and a client in communication with the server, wherein
the client is adapted to acquire a session key assigned by the server upon logging into the server and encrypt game data with the session key before submitting the game data to the server; and
the server is adapted to assign the session key to the client based on the identity of the client, receive the encrypted game data from the client, decrypt and verify the received game data, and save the game data proved to be valid.

A client apparatus in the system described in the preceding description, including:
a first interface module, adapted to exchange data between the client and a server;
an authentication request module, adapted to log in the server via the first interface module and acquire a session key assigned by the server;
an application module, adapted to receive the session key from the server via the authentication request module, run an application, and submit encrypted game data to the server via the first interface module when the game data is required to be submitted; and
a data encryption module, adapted to encrypt the game data to be submitted by the application module with the session key and send the encrypted game data to the application module.

A server in the system described in the preceding description, including:
a second interface module, adapted to exchange data between the server and a client;
an authentication confirmation module, adapted to assign a session key to the client via the second interface module;
a data decryption module, adapted to decrypt game data received via the second interface module and verify whether the game data are valid; and
a data storage module, adapted to save the game data proved to be valid by the data decryption module.

The present invention also discloses a mobile terminal containing the client apparatus described in the preceding description, including:
a first interface module, adapted to exchange data between the client and a server;
an authentication request module, adapted to log into the server via the first interface module and acquire a session key assigned by the server;
an application module, adapted to receive the session key from the server via the authentication request module, run an application, and submit encrypted game data to the server via the first interface module when the game data is required to be submitted; and a data encryption module, adapted to encrypt the game data to be submitted by the application module with the session key and send the encrypted game data to the application module.

The method of the present invention ensures that the client can transmit game data safely to the server and protects the game data from being tampered with or counterfeited.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present invention is further explained hereinafter with reference to the accompanying drawings as well as embodiments so as to make the objective, the technical solution and merits thereof more apparent. It should be understood that the embodiments herein are used for illustrating the present invention only and shall not be used in limiting the protection scope of the present invention.

In a preferred embodiment of the present invention, encryption is adopted in the starting stage and script logic execution stage of a game to ensure the safety of the game data. The embodiment can be applied to games that are launched on clients by users and in which users need to upload the game data to servers for record, e.g., Flash games.

Figure 1:
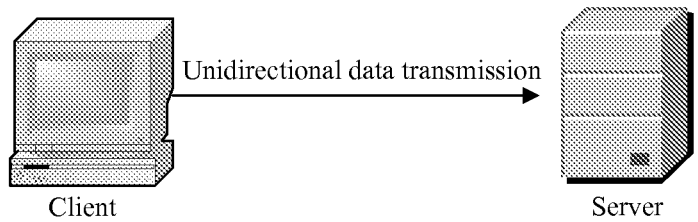
FIG. 1 is a schematic of the Flash game data transmission in the prior art.
Figure 2:
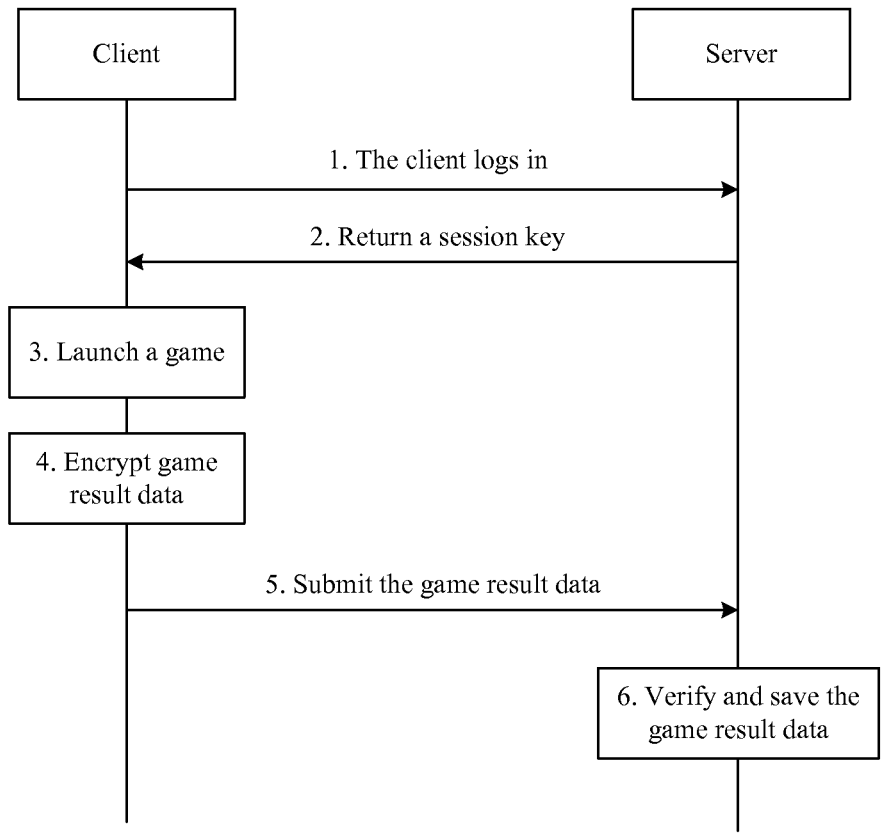
FIG. 2 is a flow chart of the Flash game data transmission in a preferred embodiment of the present invention.

FIG. 2 shows the game data transmission flow in the embodiment.

Step 1: a client logs in a server by using an identity (ID) assigned in advance.

The skilled in the field can understand that the ID used by the client can be obtained in normal user sign-up process. A password corresponding to the user ID can also be set up in the user sign-up process to protect the user ID from being stolen. When a password is set up, the client shall use the password as well as the user ID to log in the server in this step.

Step 2: the server generates a session key and returns the session key to the client.

In the preceding step, if the client provides a password while logging, the server shall firstly verify the identity of the logging client based on the password. And this step will be performed only when the identity of the client is proved to be valid, otherwise the client shall be informed that the password is incorrect.

The session key generated in this step is a string generated by the server based on identity of the client, e.g., user ID or user name, and the login time of the client by using a preset encryption algorithm.

The encryption algorithm in this step convert information from meaningful clear text into meaningless irrecognizable encrypted text via shifting the bit data representing the client ID and the login time according to a certain rule, and further inserting bytes and performing bitwise operation on the bit data.

Step 3: the client launches corresponding Flash game program upon receipt of the session key from the server.

In this embodiment, the client may further check whether the session key is received before launching the Flash game program so as to keep illegal users out of the game. The check includes: verifying, by the Flash program script, whether the session key from the server is received, and preventing the game program from being launched if the client does not have the session key or launching the game program if the client has received the session key. Therefore it can be ensured that the game is only launched in a server environment by the client authorized by the server, so that illegal users are kept out of the game and are unable to tamper with game data.

Step 4: when the client needs to submit game data to the server, the client encrypts the game data with the session key from the server.

In this step, the client may generate a result digest based on the game data to be submitted, current time and the session key by using an MD5 algorithm, and send the game data, the current time, the session key and the generated result digest to the server.

Step 5: the client uploads the encrypted game data to the server.

Step 6: upon receipt of the game data from the client, the server decrypts the game data and verifies whether the game result data from the client are valid, and saves the game data if they are proved to be valid.

In this step, upon receipt of the game data, the current time, the session key and the result digest from the client, the server generates another result digest by using the same MD5 algorithm and compares the newly generated result digest with the result digest from the client; if the two result digests are identical, the game data shall be regarded as valid.

The login time of the user submitted by the client can be compared with the current time on the server to further verify whether the user logging has expired, i.e., to verify whether the login time of the user is within the predetermined expiration limit, if the user logging has expired, the received game data shall be regarded as invalid.

According to the present invention, as a means to prevent counterfeit game data made by users of malice, feature conversion may be applied to the game data generated by the Flash game before or after the step of encrypting, e.g., features such as the format or presentation of the game data are converted according to server criteria or according to an agreement between the client and the server, therefore it can be assured that the data are generated by the Flash game logic, and they are not counterfeited outside of the game. Accordingly, the server shall apply a reversed feature conversion to the received game data before or after the step of decrypting in order to restore and save the data.

Figure 3:
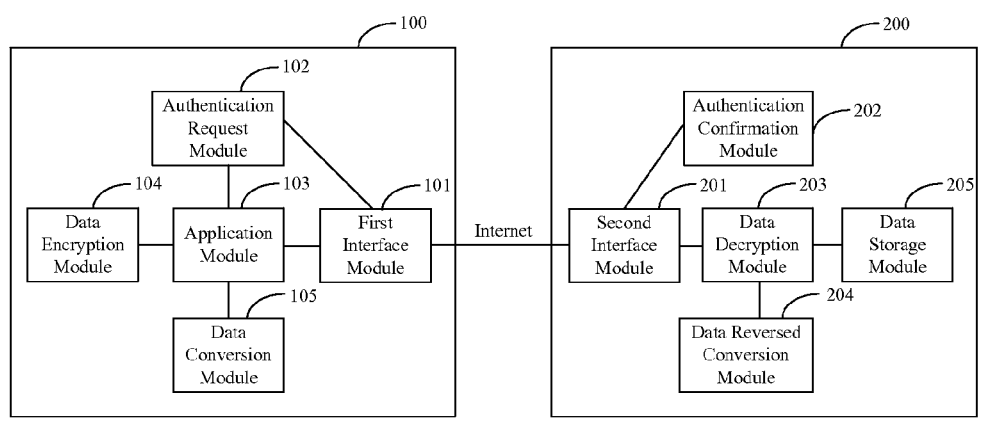
FIG. 3 is a structure diagram of the system provided by a preferred embodiment of the present invention for Flash game data transmission.

FIG. 3 shows the structure of a system in a preferred embodiment of the present invention for game data transmission. As shown in FIG. 3, the system includes a Client 100 and a Server 200, in which the Client 100 communicates with the Server 200 via the Internet. The Client 100 and the Server 200 may be connected via other means besides the Internet. The Client 100 may be any kind of terminal device, e.g., a mobile terminal such as mobile telephone or personal digital assistant, or a fixed terminal such as personal computer. The Server 200 may be a large, medium-sized or small server.

The method for the communication between the Client 100 and the Server 200 is shown in the game data transmission process in FIG. 2.

As for the internal components of the Client 100 and the Server 200, the Client 100 may include:

A First Interface Module 101, connected to the Server 200 and used for the data exchange between the Client 100 and the Server 200.

An Authentication Request Module 102, connected to the First Interface Module 101 and an Application Module 103, used for logging into the Server 200 by using a user ID, receiving a session key from the server and invoking the Application Module 103 by using the received session key to launch a Flash application or other game program.

The Application Module 103, connected to the First Interface Module 101, used for running a Flash application fixed locally on the Client 100 or an application program downloaded by the Client 100 from the Server 200 after logging into the Server 200, e.g., running a Flash game on a web page of the Server 200 after logging into the web page of the Server 200; and further for submitting encrypted game data to the Server 200 via the First Interface Module 101 when the game data need to be submitted to the Server 200.

A Data Encryption Module 104, connected to the Application Module 103, used for encrypting the game data from the Application Module 103 with the session key from the Server 200 when the Client 100 needs to submit the game data to the Server 200 and returning the encrypted game data to the Application Module 103 for further transmission to the Server 200.

The Data Encryption Module 104 may encrypt the game data by using the encryption algorithm described in the preceding Step 4.

In this embodiment, as a means to prevent illegal users from entering the game and tampering with the game data, the Flash program script should, before the Application Module 103 runs the Flash application, check whether the session key has been received from the Authentication Request Module 102. If no session key has been received, the game shall be prevented from being launched. Therefore it can be ensured that the game can only be launched in the Server 200 environment by the client authorized by the Server 200.

The Server 200 includes the following internal modules:

A Second Interface Module 201, connected to the Client 100 and used for the data exchange between the Client 100 and the Server 200.

An Authentication Confirmation Module 202, connected to the Second Interface Module 201 and used for assigning a session key to the Client 100 while the Client 100 logs in and sending the session key to the Client 100 via the Second Interface Module 201.

When the client sends a password as well as the user ID while logging, the Authentication Confirmation Module 202 shall also verify the identity of the client based on the user ID and the password, and the session key will be assigned to the client only after the client is proved to be valid.

In this embodiment, the session key is a string generated by the Authentication Confirmation Module 202 based on the identity of the Client 100, e.g., user ID or user name, and the login time of the client by using a preset encryption algorithm.

A Data Decryption Module 203, connected to the Second Interface Module 201 and used for receiving game data from the Client 100, decrypting the received game data and verifying whether the game data from the Client 100 are valid.

The Data Decryption Module 203 may check the validity of the received game data through the verification process described in Step 6.

A Data Storage Module 204, connected to the Data Decryption Module 203 and used for saving the game data that are from the Client 100 and are proved to be valid by the Data Decryption Module 203.

In this embodiment, the module can be any kind of storage media in the Server 200, e.g., system memory or storage space assigned to the Client 100 on a hard disk.

The Client 100 may further include a Data Conversion Module 105 to prevent users of malice from counterfeiting game data. The Data Conversion Module 105 is connected to the Application Module 103 and is used for applying feature conversion to the format or presentation of the game data before or after the encryption of the game data according to the criteria of the Server 200 or to an agreement between the Client 100 and the Server 200. Therefore it can be ensured that the data are not counterfeited outside of the game, but are generated by the Flash game logic. Accordingly, the Server 200 may further include a Data Reversed Conversion Module 205, which is connected to the Data Decryption Module 203 and is used for applying, before or after the decryption of the game data, reversed feature conversion to the game data from the Client 100 to restore the data and submitting the data to the Data Storage Module 204 via the Data Decryption Module 203.

It should be noted that, though the preferred embodiments are described based on Flash games, the game data transmission method, system, client and server provided by the embodiments can be applied to the game data transmission of other games without exceeding the protection scope of the present invention. Any modification, equivalent replacement and improvement made under the spirit and principle of the present invention should be included in the protection scope thereof.

What is claimed is:

1. A method for game data transmission, comprising:
acquiring, by a client upon logging into a server, a session key assigned by the server, and launching, by the client, a game program, wherein the session key is generated by shifting bit data containing a client ID of the client and a login time of the client according to a rule, and further inserting bytes and performing a bitwise operation on the bit data;
encrypting, by the client, game data generated by the game program with the session key when the game data is to be submitted, and submitting the game data to the server;
decrypting and verifying the received game data by the server, and saving the game data if the game data is proved to be valid;
applying, by the client, feature conversion to the game data to be submitted to the server before or after encrypting the game data;
applying, by the server, reversed feature conversion to the game data received by the server after or before decrypting and verifying the received game data;
wherein the encrypting includes generating, by the client, a result digest based on the game data to be submitted, time of submitting the game data and the session key by using an MD5 algorithm, and sending the game data, the time of submitting the game data, the session key and the generated result digest to the server; and
wherein the decrypting and verifying includes generating another result digest by the server based on the received game data, the time of submitting the game data by the client and the session key by using the same MD5 algorithm used by the client, comparing the result digest generated by the server with the result digest from the client, and regarding the game data as valid if the two result digests are identical; and when the result digest generated by the server is identical with the result digest from the client, comparing login time of the client with the current time on the server, checking whether the login time of the client is within a predetermined expiration limit, if yes, regarding the received game data as valid, otherwise regarding the received game data as invalid.

2. The method according to claim 1, before launching the game program, further comprising:

checking whether the session key assigned by the server is received; and launching the game program if the session key is received, otherwise preventing the game program from being launched.

3. A system for game data transmission, comprising:

a server and a client in communication with the server, each comprising a processor, wherein the client acquires a session key assigned by the server upon logging into the server, launches a game program, and encrypts game data generated by the game program with the session key before submitting the game data to the server; wherein the client applies feature conversion to the game data to be submitted to the server before or after encrypting the game data; and the server assigns the session key to the client based on the identity of the client, receives the encrypted game data from the client, decrypts and verifies the received game data, and save the game data proved to be valid; wherein the server applies reversed feature conversion to the game data and then save the game data after proving the game data to be valid after or before decrypting and verifying the received game data;

wherein the session key is generated by shifting bit data containing a client ID of the client and a login time of the client according to a rule, and further inserting bytes and performing a bitwise operation on the bit data;

wherein the encrypting includes generating, by the client, a result digest based on the game data to be submitted, time of submitting the game data and the session key by using an MD5 algorithm, and sending the game data, the time of submitting the game data, the session key and the generated result digest to the server;

wherein the decrypting and verifying includes generating another result digest by the server based on the received game data, the time of submitting the game data by the client and the session key by using the same MD5 algorithm used by the client, comparing the result digest generated by the server with the result digest from the client, and regarding the game data as valid if the two result digests are identical; and when the result digest generated by the server is identical with the result digest from the client, comparing login time of the client with the current time on the server, checking whether the login time of the client is within a predetermined expiration limit, if yes, regarding the received game data as valid, otherwise regarding the received game data as invalid.

4. The system according to claim 3, wherein the client, before launching the game program, checks whether the session key assigned by the server is received, and launches the game program if the session key is received, otherwise preventing the game program from being launched.

5. A client apparatus, comprising:

a first interface module to exchange data between the client and a server;

an authentication request module to log in the server via the first interface module and acquire a session key assigned by the server, wherein the session key is generated by shifting bit data containing a client ID of the client and a login time of the client according to a rule, and further inserting bytes and performing a bitwise operation on the bit data;

an application module to receive the session key from the server via the authentication request module, run a game program, and submit encrypted game data to the server via the first interface module when the game data is required to be submitted, so that the server decrypts and verifies the received game data, and saves the game data if the game data is proved to be valid; and a data encryption module to encrypt the game data generated by the game program run by the application module when the game data is to be submitted by the application module with the session key and send the encrypted game data to the application module;

wherein the client apparatus further comprises a data conversion module to apply feature conversion to the game data to be submitted by the application module before or after encrypting the game data; so that the server applies reversed feature conversion to the game data received by the server after or before decrypting and verifying the received game data;

wherein the encrypting includes the data encryption module generates a result digest based on the game data to be submitted, time of submitting the game data and the session key by using an MD5 algorithm, and sends the game data, the time of submitting the game data, the session key and the generated result digest to application module; the decrypting and verifying includes the server generates another result digest by based on the received game data, the time of submitting the game data by the client and the session key by using the same MD5 algorithm used by the client, compares the result digest generated by the server with the result digest from the client, when the result digest generated by the server is identical with the result digest from the client, compares login time of the client with a current time on the server, checks whether the login time of the client is within a predetermined expiration limit, if yes, regards the received game data as valid, otherwise regards the received game data as invalid.

6. A mobile terminal, comprising:

a first interface module to exchange data between the client and a server;

an authentication request module to log into the server via the first interface module and acquire a session key assigned by the server; wherein the session key is generated by shifting bit data containing a client ID of the client and a login time of the client according to a rule, and further inserting bytes and performing a bitwise operation on the bit data;

an application module to receive the session key from the server via the authentication request module, run a game program, and submit encrypted game data to the server via the first interface module when the game data is required to be submitted; so that the server decrypts and verifies the received game data, and saves the game data if the game data is proved to be valid; and a data encryption module to encrypt the game data generated by the game program run by the application module when the game data is to be submitted by the application module with the session key and send the encrypted game data to the application module;

wherein the client further comprises a data conversion module to apply feature conversion to the game data to be submitted by the application module before or after encrypting the game data; so that the server applies reversed feature conversion to the game data received by the server after or before decrypting and verifying the received game data;

wherein the encrypting includes the data encryption module generates a result digest based on the game data to be submitted, time of submitting the game data and the session key by using an MD5 algorithm, and sends the game data, the time of submitting the game data, the session key and the generated result digest to application module; the decrypting and verifying includes the server generates another result digest by based on the received game data, the time of submitting the game data by the client and the session key by using the same MD5 algorithm used by the client, compares the result digest generated by the server with the result digest from the client, when the result digest generated by the server is identical with the result digest from the client, compares login time of the client with a current time on the server, checks whether the login time of the client is within a predetermined expiration limit, if yes, regards the received game data as valid, otherwise regards the received game data as invalid.

7. A server comprising:

a second interface module to exchange data between the server and a client;

an authentication confirmation module to assign a session key to the client via the second interface module, wherein the session key is generated by shifting bit data containing a client ID of the client and a login time of the client according to a rule, and further inserting bytes and performing a bitwise operation on the bit data;

a data decryption module to decrypt game data generated by a game program in the client and received via the second interface module and verify whether the game data is valid; wherein the game data generated by a game program is encrypted with the session key acquired by the client before submitting the game data to the server; and a data storage module to save the game data proved to be valid by the data decryption module;

wherein the server further comprises a data reversed conversion module to apply reversed feature conversion to the game data from the data decryption module to restore the game data after or before decrypting and verifying the received game data; wherein the game data is applied feature conversion by the client before or after encrypting the game data;

wherein the decrypting and verifying includes the data decryption module generates another result digest by based on the received game data, the time of submitting the game data by the client and the session key by using the same MD5 algorithm used by the client, compares the result digest generated by the server with the result digest from the client, when the result digest generated by the server is identical with the result digest from the client, compares login time of the client with a current time on the server, checks whether the login time of the client is within a predetermined expiration limit, if yes, regards the received game data as valid, otherwise regards the received game data as invalid;

the encrypting includes the client generates a result digest based on the game data to be submitted, time of submitting the game data and the session key by using an MD5 algorithm, and sends the game data, the time of submitting the game data, the session key and the generated result digest to the server.

8. The server according to claim 7, wherein the data storage module is a system memory on the server or a storage space assigned to the client on a hard disk of the server.

9. A Non-transitory computer-readable medium including means for implementing a method for game data transmission, the method comprising:

acquiring, by a client upon logging into a game server, a session key assigned by the game server, and launching, by the client, a game program; wherein the session key is generated by shifting bit data containing a client ID of the client and a login time of the client according to a rule, and further inserting bytes and performing a bitwise operation on the bit data; and encrypting, by the client, game data generated by the game program with the session key when the game data is to be submitted, and submitting the game data to the game server;

applying, by the client, feature conversion to the game data to be submitted to the server before or after encrypting the game data;

decrypting and verifying the received game data by the server, and saving the game data if the game data is proved to be valid;

applying, by the server, reversed feature conversion to the game data received by the server after or before decrypting and verifying the received game data;

wherein the encrypting includes generating, by the client, a result digest based on the game data to be submitted, time of submitting the game data and the session key by using an MD5 algorithm, and sending the game data, the time of submitting the game data, the session key and the generated result digest to the server;

wherein the decrypting and verifying includes generating another result digest by the server based on the received game data, the time of submitting the game data by the client and the session key by using the same MD5 algorithm used by the client, comparing the result digest generated by the server with the result digest from the client; and when the result digest generated by the server is identical with the result digest from the client, comparing login time of the client with the current time on the server, checking whether the login time of the client is within a predetermined expiration limit, if yes, regarding the received game data as valid, otherwise regarding the received game data as invalid.

* * * * *